Jan. 31, 1933. M. DAVEY 1,895,753
MEANS FOR THE SUPPORT, PROTECTION, AND TRAINING OF FRUIT AND OTHER TREES
Filed Aug. 20, 1931
Fig. 1  Fig. 2  Fig. 3
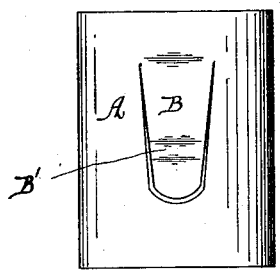
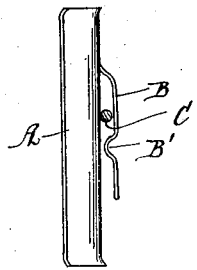
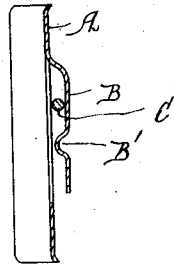
Fig. 4  Fig. 5  Fig. 6
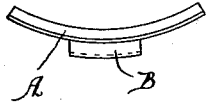
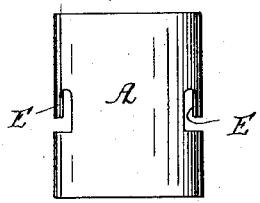
Fig. 7
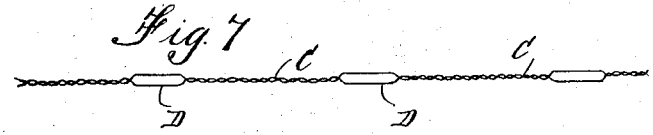
Fig. 8.
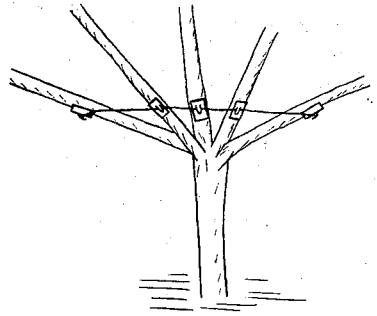
Inventor
Mason Davey
By Pennie, Davis, Marvin & Edmonds
Attorneys Patented Jan. 31, 1933

1,895,753

UNITED STATES PATENT OFFICE

MASON DAVEY, OF MAPUA, NELSON, NEW ZEALAND

MEANS FOR THE SUPPORT, PROTECTION, AND TRAINING OF FRUIT AND OTHER TREES

Application filed August 20, 1931, Serial No. 558,246, and in New Zealand January 20, 1931.

This invention has been devised with the object of providing means whereby the branches of a fruit or other tree may be supported or stayed against liability of damage through overweight thereof, or by reason of its subjection to heavy winds which would cause excessive swaying thereof, or damage through any of the causes that commonly affect the trees, and particularly fruit trees during the bearing and ripening of the fruit. The means devised also are of such a nature as will provide for the several branches of a tree being supported and held in any desired relative positions as to spacing apart around the trunk, this provision allowing for the training of the tree in its growth and spread of its branches, and also serving to protect one branch from the other during the fruit bearing period and opening up the branches to the admission of sunshine to the fruit thereon.

It is a commonly used expedient to support the branches of a tree by means of a rope or wire passed round beneath them and then tightened and its ends secured so that the tree is bound thereby. This method is however liable to cause damage to the branches by the liability of the rope or wire to cut or chafe the branches and also will tend to bunch the branches without any regard to their distances apart so that rubbing one upon the other and crowding together is liable in windy weather, with the result that fruit is lost or damaged.

The present invention provides means for use in conjunction with the tree encircling or binding wire by which the tree branches are effectually protected against any possibility of being chafed or cut by the wire and are moreover capable of being spaced at arbitrary distances apart upon the wire and retained in their spaced relationship.

These means comprise, for each branch, a small plate of metal or other suitable rigid material, that is bent lengthwise to form a curve that will fit upon the branch and which is made with a tongue, or tongues, that will provide for it being supported upon the said encircling wire. By constructing such wire with loops in it at appropriate intervals with which the tongue or tongues on the plate may make a locking engagement, the plates and the branches of a tree resting therein may be spaced apart and held in such spaced positions.

In the accompanying drawing:—

Figure 1 is an outside elevation,
Figure 2 an end elevation,
Figure 3 a sectional end elevation, and
Figure 4 a plan of a preferred form of supporting plate.
Figure 5 is an outside elevation of an alternative construction of the plate shown in Figures 1 to 4.
Figure 6 is a similar view of a further alternative form adapted for use by a suspension method.
Figure 7 is a diagram of a length of wire suitable for use with the appliances.
Figure 8 is a sketch illustrative of the manner of using the invention.

The supporting device forming the principal feature of the invention is made of a rectangular plate A of metal or other rigid material of suitable nature, but preferably of a galvanized or rust proof metal. This is curved longitudinally so that it may be placed on the curve of a tree branch to fit neatly thereon and to form a rest for such branch. The upper and lower edges of the plate are given a slight outward curve, as shown more particularly in Figures 2 and 3 in order that when a branch is resting in the device these edges will be free from any liability of cutting into the branch when the weight of the branch is caused to bear downwardly on the device.

In the form shown in Figures 1 to 4 the plate, at its centre has a tongue B stamped out therefrom and then bent backward for a distance and downwardly again so that a hook is formed projecting from the surface plane of the plate and extending downwardly. Or this tongue may be made, as shown in Figure 5, by cutting up from the bottom edge of the plate and bending the tongue rearwardly to form a hook in similar manner.

In the use of these devices, the branches of the tree to be supported are encircled by the wire C and for each branch one of the plates is provided and hooked upon the wire by causing the wire to pass on its outside and beneath its tongue B and thus to engage the branch and to support it upon the wire. In order to prevent any possibility of the device becoming free of the wire the tongue B may be formed with an inward bend B' at about half way in its height. The wire will then be sprung up beneath this bend and be retained between it and the top of the tongue.

By employing a wire band made as shown in Figure 7, with loops D at intervals in its length formed by twisting two wires together and leaving untwisted lengths at intervals (which is an article of manufacture now well known), the tongues B of the devices may be passed into loops thereof and thereby serve to keep the devices from sliding along the band. Consequently the branches of a tree may have their supports disposed at any desired intervals apart around the band, to space them in the manner and for the purposes described.

In these instances the band encircles the branches and holds them up from beneath. The form of device shown in Figure 6 is adapted for use in a system under which the band is inside the branches and the branches are supported by being suspended thereon. In this case the supporter plate is made on its two edges with the tongues E to engage the wire by hooking over it, the branch then being held between the plate and the wire.

I claim:—

1. Means for use in supporting the branches of fruit and other trees, comprising the combination with a wire band encircling the tree, of a plate of rigid material shaped to curve about its major axis and having a tongue stamped out therefrom parallel to its greatest dimension to extend downwardly over its outer convex side so that the said band may pass beneath it, said tongue being shaped to extend parallel with the plate and having an inward ledge or bend across it at a point in its height such that it is adapted to spring over the band when the band is placed beneath the tongue.

2. In the means for use in supporting the branches of fruit and other trees as recited in claim 1, a band formed with closed loops at intervals in its length each of which loops is adapted to receive the tongue of one of the said plates, one bight of said loop being clipped to the plate by said band.

3. In means for use in supporting the branches of fruit and other trees according to claim 1, outwardly curved, upper and lower edges on said plate.

In testimony whereof, I affix my signature.

MASON DAVEY.